(12) United States Patent
Takaki et al.

(10) Patent No.: US 6,605,672 B1
(45) Date of Patent: Aug. 12, 2003

(54) IMPACT MODIFIERS FOR THERMOPLASTIC RESINS

(75) Inventors: Akira Takaki, Kobe (JP); Toshio Mizuta, Takasago (JP); Tomomichi Hashimoto, Takasago (JP); Toshiyuki Mori, Akashi (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/856,459

(22) PCT Filed: Oct. 18, 2000

(86) PCT No.: PCT/JP00/07220
§ 371 (c)(1),
(2), (4) Date: Jun. 6, 2001

(87) PCT Pub. No.: WO01/30908
PCT Pub. Date: May 3, 2001

(30) Foreign Application Priority Data

Oct. 25, 1999 (JP) ............................................. 11-302264

(51) Int. Cl.⁷ .......................... C08L 51/00; C08L 27/06; C08F 291/00
(52) U.S. Cl. ........................ 525/205; 525/209; 525/221; 525/222; 525/232; 525/238; 525/239; 525/241; 525/243; 525/244; 525/317; 525/326.1; 525/329.1; 525/330.3; 525/330.7; 525/331.5; 525/333.3
(58) Field of Search ................................. 525/205, 209, 525/221, 222, 232, 238, 239, 241, 243, 244, 317, 326.1, 329.1, 330.3, 330.7, 331.5, 333.3

(56) References Cited

U.S. PATENT DOCUMENTS

| | | | | |
|---|---|---|---|---|
| 4,427,836 A | | 1/1984 | Kowalski et al. | ............ 525/301 |
| 5,541,256 A | * | 7/1996 | Takaki et al. | .................. 525/82 |
| 6,221,966 B1 | * | 4/2001 | Nakanishi et al. | ........... 525/227 |

FOREIGN PATENT DOCUMENTS

| | | |
|---|---|---|
| JP | 4-126771 | 4/1992 |
| JP | 4-275354 | 9/1992 |
| JP | 7-309918 | 11/1995 |
| JP | 10-310714 | 11/1998 |
| WO | WO 98/47961 | 10/1998 |
| WO | WO 00/02963 | 1/2000 |

* cited by examiner

Primary Examiner—Nathan M. Nutter
(74) Attorney, Agent, or Firm—Armstrong, Westerman & Hattori, LLP

(57) ABSTRACT

There is provided an excellent impact modifier for a vinyl chloride resin. There is used, as an excellent impact modifier, a copolymer which is prepared by polymerizing 10 to 70% by weight of a monomer or monomers containing 60 to 100% by weight of at least one vinyl monomer selected from the group consisting of a (meth)acrylate compound, an aromatic vinyl compound, a vinyl cyanide compound and vinyl chloride, and 0 to 40% by weight of the other monomer copolymerizable therewith, in the presence of 30 to 90% by weight of a hollow rubber particle of which glass transition temperature Tg is at most 0° C. and a void ratio is 3 to 90% by volume in a latex state, and which contains a cross linking agent in an amount of 0.1 to 5 parts by weight based on 100 parts by weight of the total rubber component monomer.

5 Claims, No Drawings

IMPACT MODIFIERS FOR THERMOPLASTIC RESINS

TECHNICAL FIELD

The present invention relates to an impact modifier for a vinyl chloride resin.

BACKGROUND ART

Conventionally, there have been various suggestions for improving the impact resistance of thermoplastic resins. For example, in the case of vinyl chloride resins it is known that a copolymer of diene-based rubber or acrylate-based rubber may be mixed thereto (Japanese Examined Patent Publication No. 39-19035/1964). Further, there are the suggestions of a method of increasing a particle size of a rubber component (Japanese Examined Patent Publication No. 42-22541/1967) and a method of lowering Tg of a rubber component (Japanese Unexamined Patent Publication Nos. 2-1763/1990 and 8-100095/1996) to improve impact resistance. However, with these methods, there are the problems that it is difficult to significantly improve impact resistance, and cost for raw material drastically increases.

Stress concentration of a molded article and formation and expansion of voids in a rubber play an important role in improving impact resistance of thermoplastic resins such as vinyl chloride resins. For obtaining stress concentration, it is essential to introduce a rubber component having elastic modulus significantly lower than that of a thermoplastic resin. Actually, optimization of the size and a shape of the rubber component has been investigated by introducing various rubbers. Formation and expansion of voids in the rubber are expected to contribute intensely to growth of shearing yield particularly having large energy absorption in an impact test, and to lead to improvement in impact resistance of a thermoplastic resin which contains a rubber.

Therefore, the method of promoting formation and expansion of voids in a rubber component at impact (under stress) of a molded article is extremely important, and formation and expansion of voids in the rubber component are considered to be significantly influenced by the cross-linking state of the rubber. Also, when a rubber component is previously made hollow, there is possibility that voids are easily propagated under stress.

Then, the relationship between void (hollow) state of a rubber component in a latex, hollow state of a thermoplastic resin molded article mixed with an impact modifier containing a rubber component, and impact strength of the molded article has been investigated by changing the amount of a cross-linking agent controlling the cross-linking condition of the rubber component. As a result, it has been found that an impact modifier comprising 30 to 90% by weight of a hollow rubber of which Tg is at most 0° C. and an amount of a cross linking agent is 0 to 5% by weight, and which is not hollow after molding and has a void ratio of 3 to 90% by volume in a latex, and 10 to 70% by weight of a monomer or monomers comprising 60 to 100% by weight of at least one vinyl monomer selected from the group consisting of a (meth)acrylate compound, an aromatic vinyl compound and a vinyl cyanide compound, and 0 to 40% by weight of a monomer copolymerizable therewith, has an extremely large effect on improving impact resistance of a thermoplastic resin. Namely, though it is basic to provide stress concentration by introducing a rubber component (Tg is at most 0° C.) having elastic modulus significantly lower than that of a thermoplastic resin such as a vinyl chloride resin which becomes a continuous phase of a molded article, it is also important to change the rubber particle to a void at impact (under stress) by decreasing the amount of a cross linking agent for this soft rubber component.

However, it has also been found that there is a tendency that a rubber particle collapses at molding and is finely dispersed and the rubber particle does not easily act as a stress concentration point when any cross linking agents become 0% by weight. Further it has been recognized from TEM observation and specific gravity measurement that a hollow rubber having a low content of a cross linking agent has voids filled with water in a latex, but in the processes of coagulation, thermal treatment, drying, blending and molding after graft polymerization, water in the rubber particle is removed, and after drying and molding, voids in the rubber collapse and disappear to become non-hollow.

On the other hand, it has been found that voids in the rubber particle are easily formed and expanded at impact (under stress) in an impact modifier containing a hollow rubber having voids in the rubber in a latex to significantly improve in impact strength. A larger amount of the cross linking agent used in a rubber is more suitable to keep the rubber particle in a hollow state. But judging from easiness of total expansion of voids, the largest improving effect is obtained by using an impact modifier containing a rubber which is hollow in a latex and is not hollow at drying and after molding by controlling an amount of a cross linking agent in a rubber to a small amount thereof.

DISCLOSURE OF INVENTION

Namely, the present invention relates to an impact modifier for a vinyl chloride resin, which is prepared by polymerizing 10 to 70% by weight of a monomer containing 60 to 100% by weight of at least one vinyl monomer selected from the group consisting of a (meth)acrylate compound, an aromatic vinyl compound, a vinyl cyanide compound and vinyl chloride, and 0 to 40% by weight of the other monomer copolymerizable therewith, in the presence of 30 to 90% by weight of a hollow rubber particle of which glass transition temperature Tg is at most 0° C., a void ratio is 3 to 90% by volume in a latex state and which contains a cross linking agent in an amount of 0.1 to 5 parts by weight based on 100 parts by weight of the total rubber component monomer.

In the impact modifier, the amount of the cross linking agent is preferably 0.1 to 1.5 parts by weight.

In the impact modifier, the amount of the cross linking agent is more preferably 0.2 to 0.7 parts by weight.

In the impact modifier, an average particle diameter of the hollow rubber in a latex state is preferably 50 to 300 nm.

Further, the present invention relates to a vinyl chloride resin composition comprising a vinyl chloride resin containing at least 50% by weight of vinyl chloride, and the above-mentioned impact modifier.

BEST MODE FOR CARRYING OUT THE INVENTION

There are various methods for preparing hollow rubber particles. For example, the following methods are well known ("Gosei Latex no Oyo (application of synthetic latex)", Takaaki Sugimura et al., p 285). The rubber particle of the present invention having voids in a latex may be prepared by any of these methods.

(a) a method wherein a W/O/W emulsion is prepared, and a monomer in the O layer is polymerized (O: lipophilic, W: hydrophilic)

(b) a method wherein core-shell particles having swellable cores are swelled at a temperature of at least the glass transition temperature of the shell layer to make hollow (c) a method using a two-step polymerization of polymers having different solubility parameter values (d) a method wherein a polymerizable monomer containing a cross linkable monomer and a hydrophilic monomer, and an oil substance are finely dispersed in water to make an O/W emulsion, and the monomer is polymerized to remove the oily substance (e) a method using migration of a carboxylic acid copolymerized into a particle under acidic or alkaline condition in the particle.

There is no particular limitation for the hollow rubber component used in the present invention, as long as it is a rubber elastomer of which the glass transition temperature is at most 0° C. But the lower the glass transition temperature is, the better. The glass transition temperature is required to be at most 0° C., and preferably −20 to −130° C. When the glass transition temperature is more than 0° C., an improving effect for impact resistance remarkably decreases.

Examples of the rubber satisfying these conditions are a diene rubber, an acrylic rubber, a silicon rubber and an olefin rubber, but the rubber is not limited thereto. Examples of the diene rubber are a butadiene rubber, a styrene-butadiene rubber, an acrylonitrile-butadiene rubber and the like. Examples of the acrylic rubber are a butyl acrylate rubber, a butadiene-butyl acrylate rubber, a 2-ethylhexyl acrylate-butyl acrylate rubber and the like. Examples of the silicon rubber are a polydimethyl siloxane rubber and the like. Examples of the olefin rubber are an ethylene-propylene rubber, an ethylene-propylene-diene rubber and the like.

The cross-linking agent used for rubber polymerization prevents the rubber particle from collapsing into smaller pieces at molding. When an amount thereof is too high, the collapsing at molding does not rise at all, but voids are not easily expanded at impact (under stress) and the impact strength of the final molded article is small. Examples of the cross-linkable monomer as the cross-linking agent are allyl methacrylate, divinylbenzene, diallyl phthalate, polyethylene glycol dimethacrylate, 1,3-butylene glycol dimethacrylate, ethylene glycol dimethacrylate and the like. These may be used solely or in a combination use of two or more thereof. An amount of the cross-linking agent is 0.1 to 5 parts by weight, preferably 0.1 to 1.5 parts by weight, more preferably 0.2 to 0.7 part by weight based on 100 parts by weight of the rubber component monomer. When the amount thereof is more than 5 parts by weight, voids can not be easily expanded and then an improving effect for impact resistance of the obtained molded article becomes small. On the other hand, when the amount is less than 0.1 part by weight, the rubber particles collapse into pieces to decrease the improving effect for impact resistance of the resulted molded article.

When a monomer is polymerized in the presence of a hollow rubber particle, the monomer may be polymerized as it is with the hollow rubber particle to obtain a graft polymer, or a larger graft polymer may be obtained by enhancement methods such as acid enhancement and salt enhancement of a rubber particle.

Voids of a rubber which are hollow in a latex state can be confirmed by TEM observation after embedding a rubber latex in an epoxy resin and the like, dying it with ruthenium tetraoxide or the like. Further, the void ratio can be calculated by exactly measuring the particle size of a rubber latex by Microtrac UPA (Ultrafine Particle Analyzer) and the like, and then measuring light scattering strength of the same rubber latex. The void ratio of hollow rubber particle in a latex is 3 to 90% by volume, preferably 10 to 60% by volume from the viewpoint of improvement in impact resistance of the final molded article. When the void ratio is more than 90% by volume, the rubber particle may collapse at molding, and impact strength can not be stably improved. When the void ratio is less than 3% by volume, formation and expansion of voids in a rubber are not easily propagated at impact in the final molded article, and an improving effect for impact resistance decreases.

In order to maximize the improving effect, the particle size of the graft copolymer of the present invention is preferably 0.05 to 2.0 µm, but the suitable value is slightly varied depending on the kind of a thermoplastic resin. Out of this range, the improving effect for impact resistance tends to decrease.

There is no particular limitation for the method for preparing hollow rubber, and the rubber can be efficiently prepared by using emulsion polymerization.

The graft copolymer of the present invention is obtained by polymerizing 10 to 70% by weight, preferably 12 to 40% by weight of a monomer in the presence of 30 to 90% by weight, preferably 60 to 88% by weight of a hollow rubber component. When the amount of the hollow rubber component is less than 30% by weight, the improving effect for impact resistance is small. When it is more than 90% by weight, a particle of the impact modifier collapses at molding the mixed composition, and the improving effect for impact resistance of the molded article becomes small.

The monomer polymerized in the presence of a hollow rubber particle is a monomer or monomers containing at least one selected from the group consisting of a (meth)acrylate compound, an aromatic vinyl compound, a vinyl cyanide compound and vinyl chloride in an amount of at least 60% by weight and the other monomer copolymerizable therewith in an amount of at most 40% by weight.

Examples of the (meth)acrylate are methacrylates such as methyl methacrylate, ethyl methacrylate, butyl methacrylate and 2-ethylhexyl methacrylate; acrylates such as methyl acrylate, ethyl acrylate, butyl acrylate and 2-ethylhexyl acrylate; and the like. Examples of the aromatic vinyl compound are styrene, α-methylstyrene, chlorstyrene and the like. Examples of the vinyl cyanide compound are acrylonitrile, methacrylonitrile and the like.

Examples of the other copolymerizable monomer are (meth)acrylates other than the above-described esters such as glycidyl (meth)acrylate, and maleimide compounds such as maleimide and N-phenylmaleimide.

Examples of the vinyl chloride resin used in the present invention are a poly(vinyl chloride), and a copolymer of at least 50% by weight of vinyl chloride and a monomer copolymerizable with vinyl chloride such as vinyl acetate and ethylene, a chlorinated vinyl chloride resin and the like.

The amount of the impact modifier used is usually 1 to 30 parts by weight based on 100 parts by weight of the vinyl chloride resin. When the amount is less than 1 part by weight, an improving effect for impact resistance is not recognized. When the amount is more than 30 parts by weight, there is a tendency that a tensile strength of the obtained molded article decreases.

The present invention is explained below by way of Examples in detail, but the present invention is not limited thereto. In Examples, "part" and "%" mean "part by weight" and "% by weight", respectively, unless otherwise specified.

EXAMPLE 1

There were mixed 200 parts of water, 3.5 parts by weight of sodium oleate, 0.4 part of tripotassium phosphate, and 0.2 part by weight of a Na salt of β-naphthalenesulfonic acid-formalin condensate. After 10 parts of butyl acrylate, 3 parts of t-dodecylmercaptane, and 0.1 part of p-methane hydroperoxide were mixed, the mixture was heated to 50° C. To the mixture was added 0.002 part of ferrous sulfate ($FeSO_4.7H_2O$), 0.005 part of ethylenediaminetetraacetic acid.2 Na salt, and 0.2 part of sodium formaldehyde sulfoxylate to polymerize them for 1 hour. Then, to this was continuously added a mixture of 90 parts of butyl acrylate, 27 parts of t-dodecylmercaptane and 0.9 part of p-methane hydroperoxide over 3 hours. Post polymerization was conducted for 2 hours to obtain a seed latex (S-1) having an average particle size of 0.04 μm.

There were mixed 2 part (solid content) of the seed latex S-1 and 50 parts water. Thereto was added a mixture comprising 98 parts of butyl acrylate, 0.3 part of allyl methacrylate, 0.75 part (solid content) of a 5% sodium laurylsulfate aqueous solution and 400 parts of water, which was finely dispersed by using a homogenizer. And the mixture was stirred for 1 hour at a room temperature. To this was added 0.002 part of ferrous sulfate ($FeSO_4.7H_2O$), 0.005 part of ethylenediaminetetraacetic acid.2 Na salt, 0.2 part of sodium formaldehyde sulfoxylate, and 1 part of p-methane hydroperoxide. They were polymerized for 4 hours at 40° C. to obtain a hollow rubber latex (R-1) having a void ratio of 30% by volume and a particle size of 0.15 μm.

After 85 parts (solid content) of the hollow rubber latex R-1 was heated to 45° C., thereto were added 0.15 part (solid content) of a 5% sodium laurylsulfate aqueous solution, 0.0016 part of ferrous sulfate ($FeSO_4.7H_2O$), 0.004 part of ethylenediaminetetraacetic acid.2 Na salt and 0.2 part of sodium formaldehyde sulfoxylate. To this was continuously added a mixture comprising 15 parts of methyl methacrylate and 0.01 part of cumene hydroperoxide over 1 hour, and post polymerization was conducted for 1 hour to obtain a hollow graft copolymer latex (G-1) having an average particle size of 0.18 μm.

This hollow graft copolymer latex (G-1) was coagulated with calcium chloride, and subjected to thermal treatment, dehydration and drying, to obtain a hollow graft copolymer (A-1) in the form of powder.

To 100 parts of a vinyl chloride resin (available from Kaneka Corp., KANEVINYL S400) having a polymerization degree of 400 were mixed 10 parts of the hollow graft copolymer (A-1), 3.0 parts of octyl tin mercaptide stabilizer, 1.0 part of stearyl alcohol, 0.5 part of stearic amide, 0.5 part of diol montanate, and 1.0 part of a processing aid (available from Kaneka Corp., PA10). And then, and the mixture was, extruded by using a 50 mm single screw extruder (type VS50-26) made by Tanabe Plastic Machine K.K. under conditions of a rotational speed of 30 rpm, C1: 140° C., C2: 160° C., C3: 160° C., C4: 165° C. and D: 160° C., to obtain a resin pellet. Then, the resin pellet was injection molded by using an injection molding machine IS-170G made by Mitsubishi Heavy Industries, Ltd. (C1: 150° C., C2: 160° C., C3: 170° C., nozzle: 175° C. mold temperature: 40° C.) to obtain a test piece for dumbbell, Izod test Izod strength was measured according to JIS-K7110. Results are shown in Table 1.

EXAMPLES 2 to 4

Preparation, coagulation, thermal treatment, dehydration, drying powder forming, compounding, molding and evaluation were conducted in the same manners as in Example 1 except that the amount of allyl methacrylate as a rubber component was changed to 0.5 part, 1.0 part and 5.0 parts, respectively. Results are shown in Table 1.

EXAMPLE 5

Preparation, coagulation, thermal treatment, dehydration, drying powder forming, compounding, molding and evaluation were conducted in the same manner as in Example 1 except that the amount of t-dodecylmercaptane at the seed polymerization was changed to 10 parts. Results are shown in Table 1.

COMPARATIVE EXAMPLE 1

A mixture comprising 100 parts of butyl acrylate, 0.5 part of allyl methacrylate, 1.2 parts (solid content) of a 5% sodium laurylsulfate aqueous solution and 450 parts of water was finely dispersed by using a homogenizer, and the mixture was stirred for 1 hour at a room temperature. To the mixture was added 0.002 part of ferrous sulfate ($FeSO_4.7H_2O$), 0.005 part of ethylenediaminetetraacetic acid.2 Na salt, 0.2 part of sodium formaldehyde sulfoxylate and 1.0 part of p-methane hydroperoxide. They were polymerized for 4 hours at 40° C. to obtain a usual rubber latex (R-2) having a void ratio of 0% by volume and a particle size of 0.15 μm.

After 85 parts (solid content) of the usual rubber latex (R-2) was heated to 45° C., thereto were added 0.15 part (solid content) of a 5% sodium laurylsulfate aqueous solution, 0.001 part of ferrous sulfate ($FeSO_4.7H_2O$), 0.004 part of ethylenediaminetetraacetic acid.2 Na salt, and 0.2 part of sodium formaldehyde sulfoxylate. To the mixture was continuously added a mixture of 15 parts of methyl methacrylate and 0.01 part of cumene hydroperoxide over 1 hour. Post polymerization was conducted for 1 hour to obtain a usual graft copolymer latex (G-2) having an average particle size of 0.18 μm. Post treatment, molding and evaluation were conducted in the same manner as in Example 1. Results are shown in Table 1.

COMPARATIVE EXAMPLE 2

Polymerization, coagulation, thermal treatment, dehydration, drying powder forming, compounding, molding and evaluation were conducted in the same manner as in Comparative Example 1 except that the amount of allyl methacrylate as the rubber component was changed to 7.0 part. Results are shown in Table 1.

COMPARATIVE EXAMPLES 3 to 4

Polymerization, coagulation, thermal treatment, dehydration, drying powder forming, compounding, molding and evaluation were conducted in the same manner as in Example 1 except that the amount of allyl methacrylate as the rubber component was changed to 7 parts and 10 parts, respectively. Results are shown in Table 1.

COMPARATIVE EXAMPLE 5

Polymerization, coagulation, thermal treatment, dehydration, drying, compounding, molding and evaluation were conducted in the same manner as in Example 1 except that the amount of the hollow rubber in the graft polymerization was changed to 5 parts and the amount of methyl methacrylate was changed to 95 parts. Results are shown in Table 1.

TABLE 1

| | Graft copolymer in molded article | | Vinyl chloride resin molded article | |
|---|---|---|---|---|
| Kind of rubber | Amount of cross-linking agent in rubber (%) | Void ratio of rubber particle (% by volume) | Amount of rubber (parts) | Izod impact Strength (kgf-cm/cm$^2$) |
| Ex. No. | | | | |
| 1 | Hollow rubber | 0.3 | 30 | 85 | 51 |
| 2 | Hollow rubber | 0.5 | 30 | 85 | 65 |
| 3 | Hollow rubber | 1.0 | 30 | 85 | 44 |
| 4 | Hollow rubber | 5.0 | 30 | 85 | 31 |
| 5 | Hollow rubber | 0.5 | 10 | 85 | 40 |
| Com. Ex. No. | | | | |
| 1 | Usual rubber | 0.5 | 0 | 85 | 21 |
| 2 | Usual rubber | 7.0 | 0 | 85 | 14 |
| 3 | Hollow rubber | 7.0 | 30 | 85 | 22 |
| 4 | Hollow rubber | 10.0 | 30 | 85 | 16 |
| 5 | Hollow rubber | 0.5 | 30 | 5 | 8 |

INDUSTRIAL APPLICABILITY

The impact modifier of the present invention has an excellent improving effect for impact resistance toward a vinyl chloride resin, since it uses a suitable cross linking agent and a rubber particle having a suitable void ratio.

What is claimed is:

1. An impact modifier for a vinyl chloride resin, which is prepared by polymerizing 10 to 70% by weight of a monomer or monomers containing 60 to 100% by weight of at least one vinyl monomer selected from the group consisting of a (meth)acrylate compound, an aromatic vinyl compound, a vinyl cyanide compound and vinyl chloride, and 0 to 40% by weight of the other monomer copolymerizable therewith, in the presence of 30 to 90% by weight of a hollow rubber particle of which glass transition temperature Tg is at most 0° C. and a void ratio is 3 to 90% by volume in a latex state, and which contains a cross linking agent in an amount of 0.1 to 5 parts by weight based on 100 parts by weight of the total rubber component monomer.

2. The impact modifier of claim 1, wherein the amount of the cross linking agent is 0.1 to 1.5 parts by weight.

3. The impact modifier of claim 1, wherein the amount of the cross linking agent is 0.2 to 0.7 part by weight.

4. The impact modifier of claim 1, wherein an average particle diameter of the hollow rubber in a latex state is 50 to 300 nm.

5. A vinyl chloride resin composition comprising a vinyl chloride resin containing at least 50% by weight of vinyl chloride, and the impact modifier of claim 1.

* * * * *